March 23, 1943.  W. A. DE VELLIER  2,314,391
SCREW AND ITS METHOD OF MANUFACTURE
Filed Aug. 6, 1941  10 Sheets-Sheet 1

Inventor:
William A. DeVellier,
by Thomas A. Jenckes
Attorney

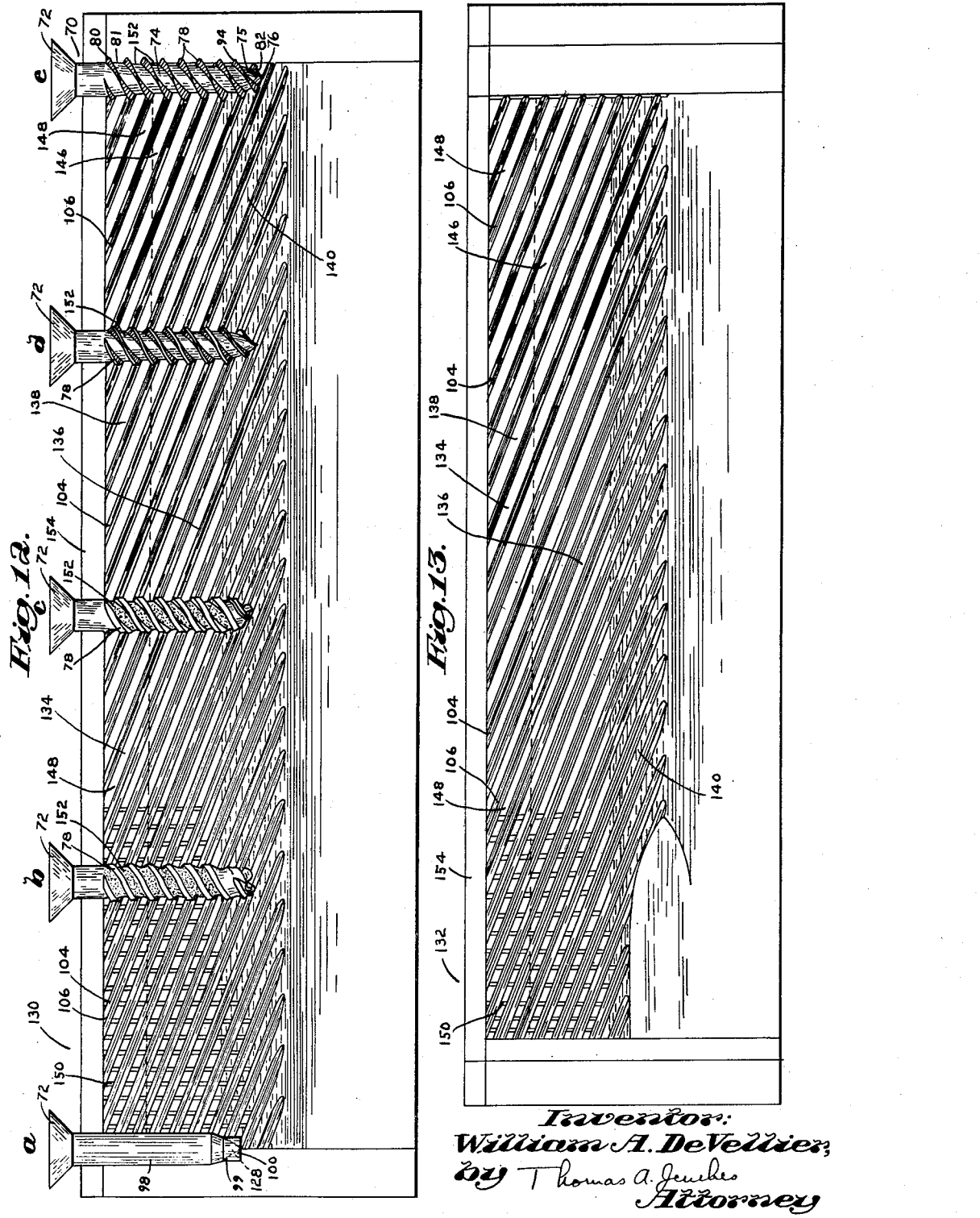

March 23, 1943.  W. A. DE VELLIER  2,314,391
SCREW AND ITS METHOD OF MANUFACTURE
Filed Aug. 6, 1941  10 Sheets-Sheet 3
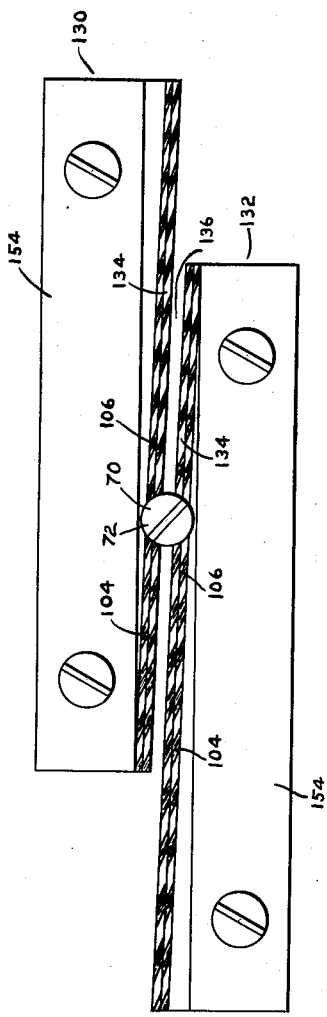
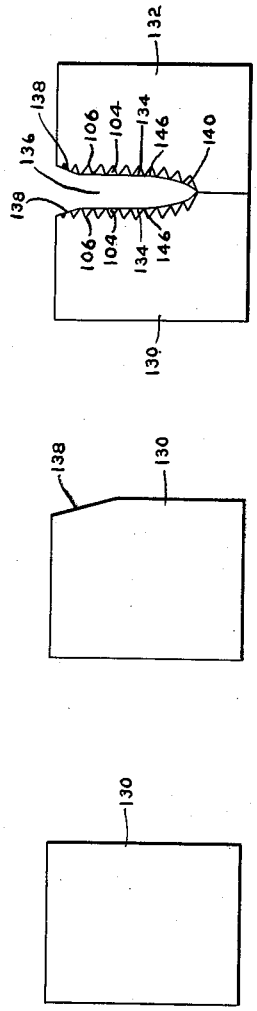
Inventor:
William A. DeVellier,
by Thomas A. Jenches
Attorney March 23, 1943.  W. A. DE VELLIER  2,314,391
SCREW AND ITS METHOD OF MANUFACTURE
Filed Aug. 6, 1941   10 Sheets-Sheet 4
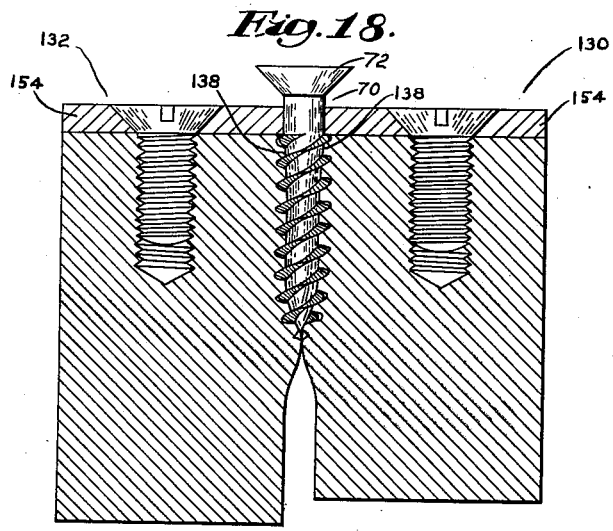
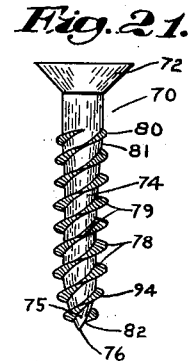
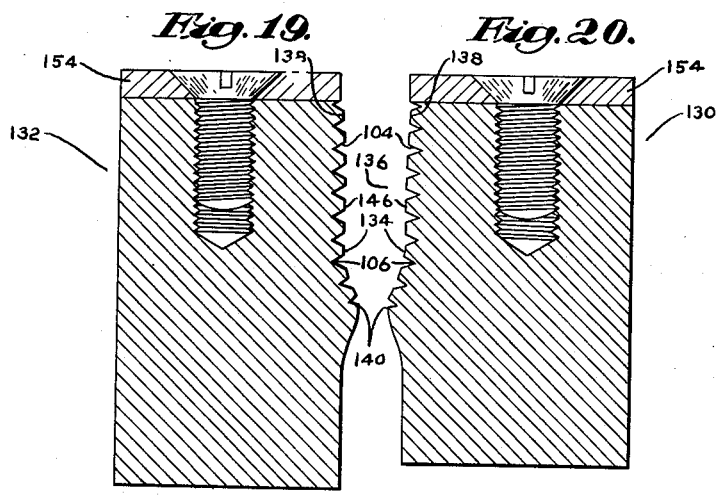
Inventor:
William A. DeVellier,
by Thomas A. Jenks
Attorney,

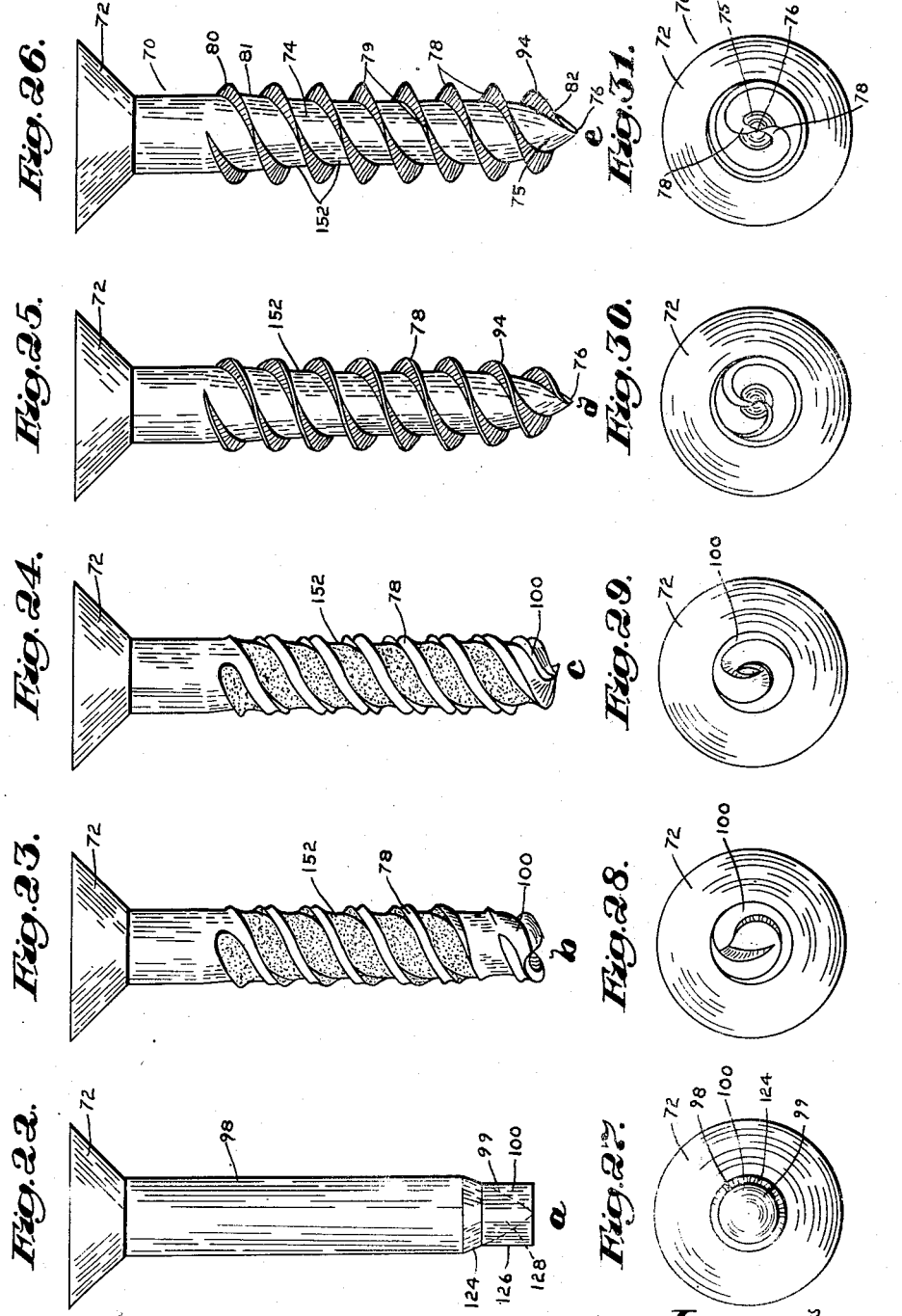

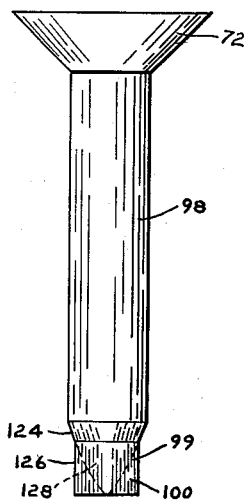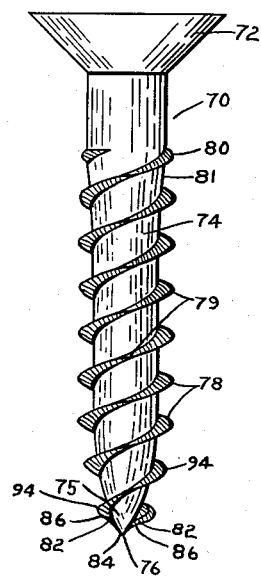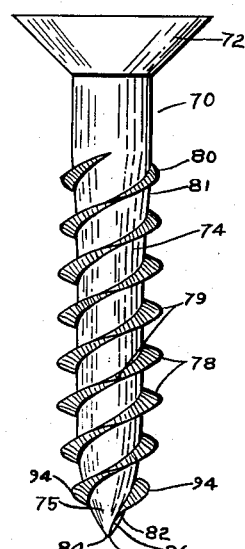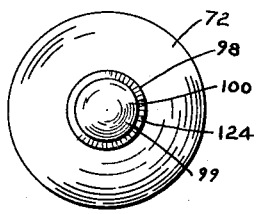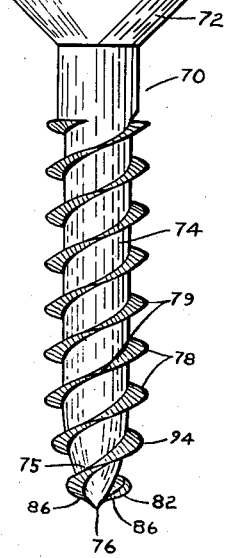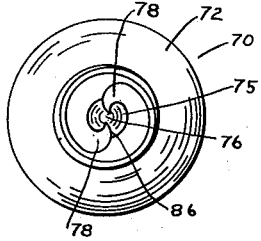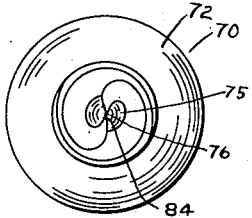

Inventor:
William A. DeVellier,
by Thomas A. Jenkes
Attorney

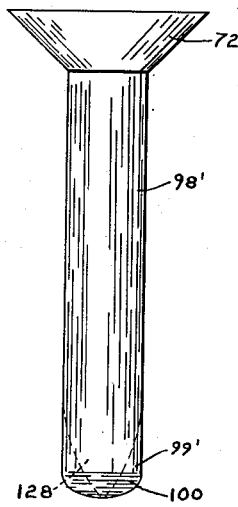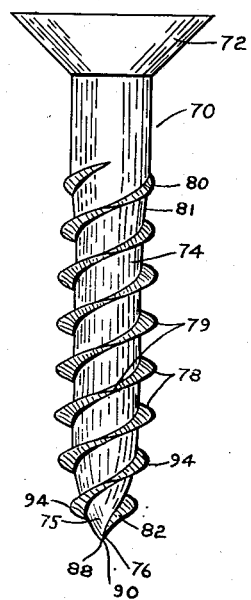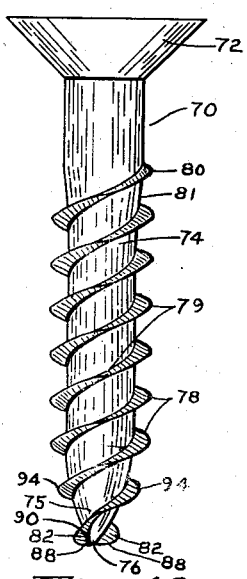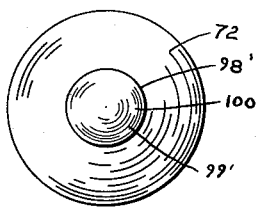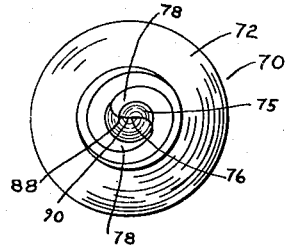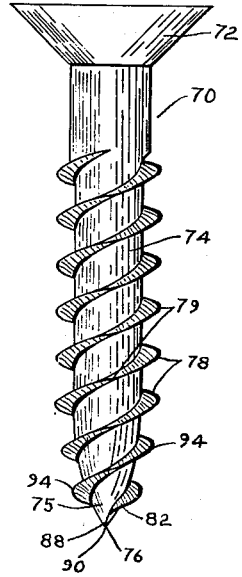

March 23, 1943. W. A. DE VELLIER 2,314,391
SCREW AND ITS METHOD OF MANUFACTURE
Filed Aug. 6, 1941 10 Sheets-Sheet 9
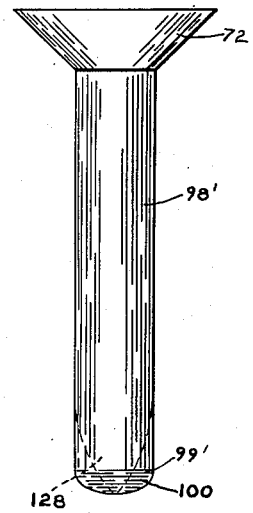
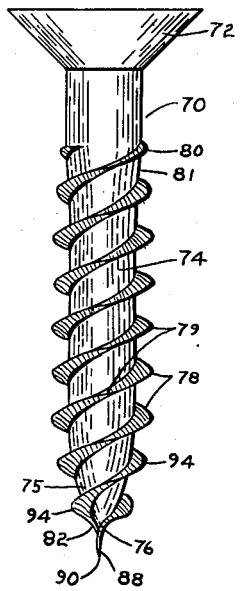
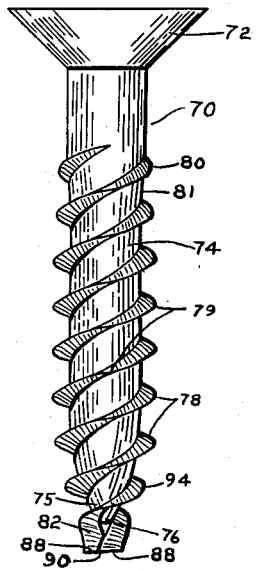
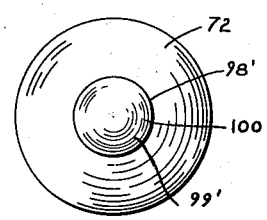
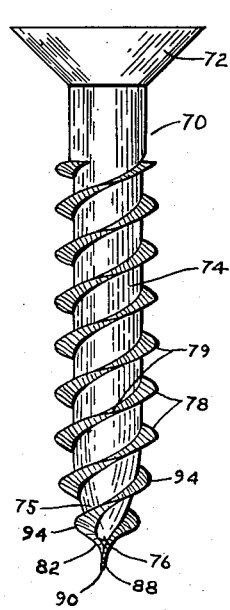
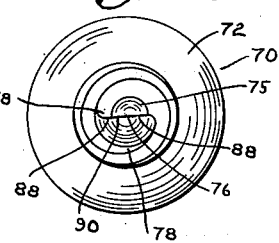
Inventor:
William A. DeVellier,
by Thomas A. Jenckes
Attorney March 23, 1943. W. A. DE VELLIER 2,314,391
SCREW AND ITS METHOD OF MANUFACTURE
Filed Aug. 6, 1941 10 Sheets-Sheet 10

Inventor:
William A. DeVellier,
by Thomas A. Jenckes
Attorney

Patented Mar. 23, 1943

2,314,391

UNITED STATES PATENT OFFICE 2,314,391

SCREW AND ITS METHOD OF MANUFACTURE

William A. De Vellier, New York, N. Y., assignor to New Process Screw Corporation, Waterville, Conn., a corporation of Delaware Application August 6, 1941, Serial No. 405,678

26 Claims. (Cl. 80—61)

My invention relates to improvements in rolled screws and method and apparatus for their manufacture, and is particularly adapted for double threaded screws.

An object of my invention is to provide continuous double threads extending the desired distance along the shank and along the pointed portion of the shank, each thread tapering outwardly to a sharp continuous spiral cutting edge, sharper than any edge which can be provided on a cut screw and simulative of a razor edge.

Great difficulty has hitherto been experienced in rolling threads down to the tip of the pointed portion of the screw shank. In the prior art, most shanks have been pointed in a pointing machine which gives a straight conical pointed portion, specifically removing the metal for this purpose with the thought of providing a shank having a conical pointed portion. Due to the fact that so much metal has been removed, I have found that there is not sufficient metal left from which threads extending to the tip of the pointed portion of the shank may be formed. I have discovered, however, that if a length of stock be pressure shaped to form the head of a screw blank on one end and an irregular shaped pointed portion having excess metal thereon than required for a conical pointed portion on the opposite end thereof and the screw blanks subjected to any suitable type of rolling operation, continuous double threads may be formed on the pointed portion of the shank from said excess metal displaced from said pointed end portion to form continuous double threads extending at least to the tip of said pointed portion. While it has been difficult to roll single threads on a screw extending to the tip of the pointed portion of the shank, it has been extremely difficult when rolling double threads to roll them to the tip of the pointed portion of the shank as more metal is required to provide the material for two threads than for one. I believe I am the first, therefore, to successfully roll a double threaded screw having double threads extending at least to the tip of the pointed portion of the shank. In certain respects this application is a continuation in part of my former application for patent for Screws and method and apparatus for making same, S. N. 290,621, filed August 17, 1939. In the embodiments shown in this application, however, I axially force the metal to form the point on the ends of the threads down from the mass of excess metal formed on the pointed portion of the shank, whereas in the method shown in said application, the metal is never axially extruded but always radially extruded.

A further object of my invention, therefore, is to provide a predetermined amount of excess metal on the pointed portion of the shank and so roll the threads as to shape the ends of each of said threads into sharp incising means projecting substantially axially downwardly of the pointed portion of said shank, the excess metal being axially displaced and molded downwards to form continuous double threads on the pointed portion of the shank, each thread terminating in sharp incising means of a desired predetermined shape projecting substantially axially downwardly of said pointed portion of the shank, the amount of excess metal originally provided on said pointed portion depending on the predetermined shape desired in the sharp substantially axially downwardly projecting incising means formed by the end of each respective thread.

It is thus apparent that I can provide a single point double threaded screw of the type shown in Arenz Patent No. 1,651,796, only producing a far superior product as it may be rolled so that the threads thereof have much sharper cutting edges and a sharper incising point. Employing my invention, however, I am also able to roll a screw in which the point formed by the merging of the threads terminates below the tip of the pointed portion of the shank. It is apparent that by varying said excess of metal and/or the method of rolling, the point formed by the merging of the threads projecting substantially axially downwardly may terminate at or below the tip of the pointed portion of the shank.

I have further discovered that if a still greater excess of metal be provided at the pointed portion of the shank, there may be sufficient metal so that the ends of said double threads may form oppositely positioned aligned cutting edges extending radially outwardly from the axis of said shank and projecting substantially axially downwardly on each side of said pointed portion of said shank to form a sharp cutting chisel-like blade, the end of which may terminate substantially at or below the tip of the pointed portion of the shank, depending on the amount of excess metal provided and the manner in which the screw is rolled. This feature of providing a single cutting blade can only be provided by my improved method, as it is obvious that screw threads cannot be cut from a blank so as to form a single cutting blade.

I have also discovered that a new type of screw may be formed by my improved method by varying said excess of metal on the pointed portion of the shank and/or the amount and nature of rolling so that the ends of said double threads may project axially downwardly on each side of said pointed portion of the shank and terminate in spaced incising points or blades on each side of said pointed portion, said points or blades terminating at or below the tip of the pointed portion of said shank as predetermined by the amount of metal provided and the amount and nature of the rolling. It is obvious that such a screw may initially bite into the wood or other material at two points or portions, tending to more accurately initially align it, thus tending to provide a self-centering screw.

A further feature of my invention relates to improvements in the rolling dies, both in the pitch angle thereof and the included angle thereof to provide the sharp cutting edges in the threads.

In the prior art it has hitherto been thought necessary after a screw blank has been suitably headed in the header to point it to provide a conically pointed shank portion by removing metal, which feature could not be conveniently done in the header to provide the sharp conically pointed shank portion formerly thought desirable. Inasmuch as for the purposes of employing my improved method a shank pointed portion having a sharp tip is not necessary, I have discovered that blunt pointed shank portions of a desired predetermined shape having the required excess of metal thereon to provide the threads extending to the tip of the pointed portion of the shank may be simultaneously formed in the header in a single operation as the head itself is being formed on the screw blank, and I am, therefore, able by a single heading operation to provide both the head and a suitably pointed shank portion so that after a single punching operation a screw blank may be provided immediately ready for rolling into my improved screw. It is obvious, however, that, insofar as the broader aspects of my invention are concerned, the excess metal on the point forming portion of said blank may be formed by milling off or otherwise removing excess metal from the blunt end of a cylindrical or otherwise shaped shank, or by extrusion pointing, as described in my said copending application, or in any other suitable manner.

These and such other objects of my invention as may hereinafter appear will be best understood from a description of the embodiments thereof shown in the accompanying drawings.

Fig. 1 is a sectional view through a female heading die of a suitable header containing a length of cylindrical stock to be made into the finished screw.

Fig. 2 is a sectional view through the female die shown in Fig. 1 and the multiple punch holder of a suitable header showing the coning punch in the simultaneous function of initiating the shape of the head and forming the opposite end of the piece of stock into a shank end having an irregularly shaped pointed portion having an excess of metal thereon greater than required for a conically pointed portion in accordance with my invention, thus pointing the shank to provide the desired irregular shape with the initial coning punch stroke of the header.

Figs. 12 and 13 are face views respectively of the stationary and movable dies for rolling double threads on the screw blanks shown in Figs. 4–11, Fig. 12 additionally illustrating screw blanks at different stages of rolling of the screw threads thereon, the positions of the blanks indicating the shape of the threads at substantially the positions shown thereon as the blank is being rolled thereacross.

Fig. 14 is a plan view of the two dies in the act of rolling threads on a screw.

Figs. 15–17 illustrate my improved method of forming these dies, Fig. 15 being an end elevation of a die blank, Fig. 16 being a view similar to Fig. 15 after a portion of said die blank adjacent one edge thereof has been removed, and Fig. 17 being a view similar to Fig. 16 after the blank receiving cavity and thread forming grooves have been cut on two of such blanks forming them into the dies.

Fig. 18 is a sectional view taken across the two dies and showing a substantially completely rolled screw in position between them.

Figs. 19 and 20 are sectional views through the two dies showing them in slightly spaced apart relationship.

Fig. 21 is a side elevation of a completed screw constructed in accordance with my invention fabricated in the manner shown in the previous figures.

Figs. 22–26 are enlarged side elevations and Figs. 27–31 are enlarged reverse plan views of the screw blanks in the different respective stages of rolling illustrated in Fig. 12.

Figs. 32–63 illustrate various embodiments of screws constructed in accordance with my invention, all having double threads with the ends of said threads forming sharp incising means projecting substantially axially downwardly of the pointed portion of the shank.

Figs. 32–36 illustrate an embodiment of my invention in which the ends of said threads are merged to form a sharp incising point and also form oppositely positioned cutting edges extending obliquely upwardly from said point and projecting axially downwardly on each side of the pointed portion of the shank, Fig. 32 being a side elevation and Fig. 33 a reverse plan view of a suitable blank for rolling this species of screw, Fig. 34 being a side elevation and Fig. 35 a reverse plan view of the completed screw, and Fig.

36 being a side elevation taken at right angles to the side elevation shown in Fig. 34, with the upper ends of the threads tapering radially inwardly to the shank in a manner more fully to be described.

Fig. 37 is a side elevation and Fig. 38 is a reverse plan view of an embodiment of screw similar to that shown in Figs. 34–36, but in which the double threads do not extend completely to the pointed portion of the shank and are not merged to form a sharp incising point, and in which the upper ends of the threads do not taper inwardly to the shank.

Figure 39:
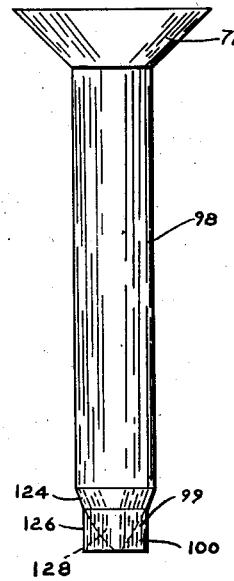
Figure 43:
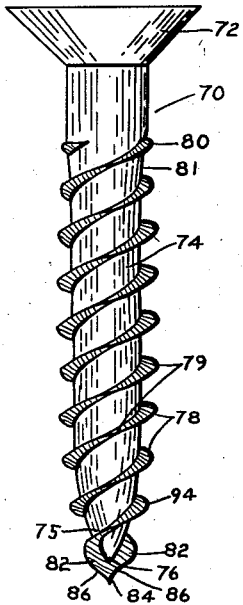
Figure 41:
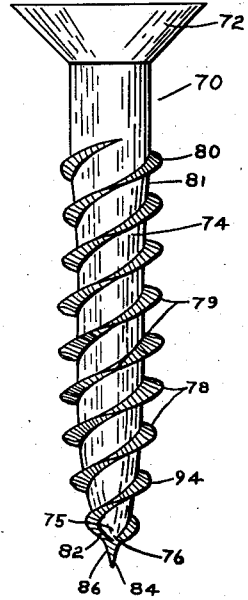
Figure 40:
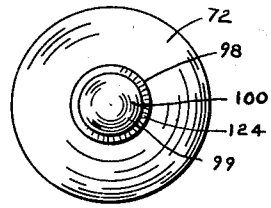
Figure 42:
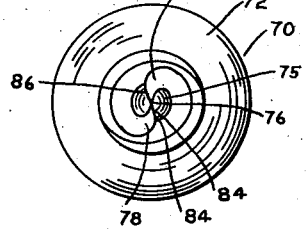

Figs. 39–43 illustrate an embodiment of my invention similar to that shown in Figs. 34–36, with the exception that the threads are merged to form the sharp incising point below the tip of the pointed portion of the shank, Fig. 39 being a side elevation and Fig. 40 a reverse plan view of a suitable blank for rolling this species of screw, Fig. 41 being a side elevation, Fig. 42 a reverse plan view and Fig. 43 being a side elevation taken at right angles to the side elevation shown in Fig. 41 of the completed screw having the upper ends of the threads tapering inwardly to the shank.

Figure 44:
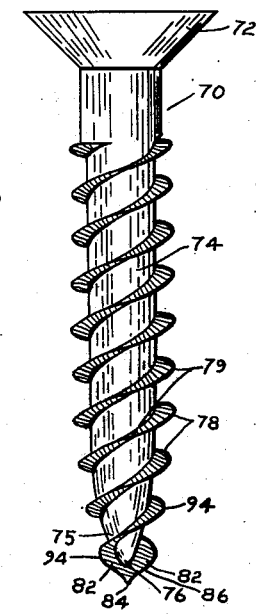

Fig. 44 is a side elevation of an embodiment of screw similar to that shown in Figs. 41–43 in which the double threads are not tapered to the shank near the upper end thereof.

Figs. 45–49 illustrate an embodiment of my invention in which the ends of the double threads form oppositely positioned aligned cutting edges extending radially outwardly from the tip of the pointed portion of the shank projecting axially downwardly on each side of said pointed portion of the shank, to form a sharp cutting blade, Fig. 45 being a side elevation and Fig. 46 a reverse plan view of a suitable domed shape blank for rolling this species of screw, Fig. 47 being a side elevation, Fig. 48 a reverse plan view and Fig. 49 being a side elevation taken at right angles to the side elevation shown in Fig. 47 of the completed rolled screw with the upper ends of the threads tapering inwardly to the shank.

Fig. 50 is a side elevation of an embodiment of screw similar to that shown in Figs. 47–49 but in which the double threads are not tapered near their upper ends.

Figs. 51–55 illustrate an embodiment of my invention generally similar to the embodiment of my invention shown in Figs. 45–49, with the exception that the sharp cutting blade terminates well below the point of the shank, Fig. 51 being a side elevation and Fig. 52 a reverse plan view of a suitable dome shaped blank for rolling this species of screw, Fig. 53 being a side elevation, Fig. 54 a reverse plan view and Fig. 55 a side elevation taken at right angles to the side elevation shown in Fig. 53 of the completed rolled screw, with the upper ends of the double threads tapering inwardly to the shank.

Fig. 56 is a side elevation of an embodiment of screw similar to that shown in Figs. 51–55 but in which the double threads are not tapered near their upper ends.

Figure 61:
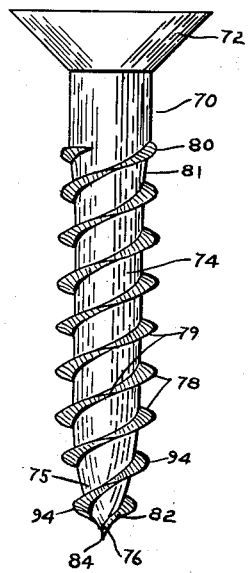
Figure 59:
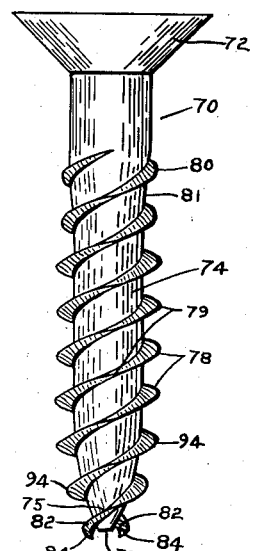
Figure 62:
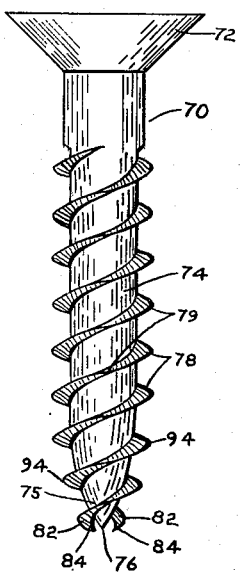
Figure 60:
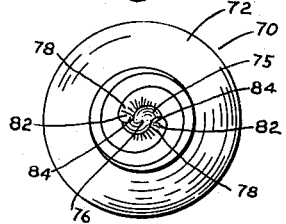
Figure 63:
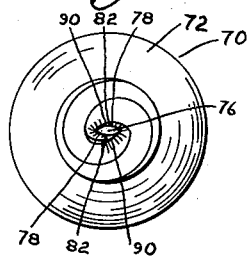

Figs. 57–63 illustrate an embodiment of my invention wherein the ends of the threads are not merged to form a single point or blade, the metal not being rolled down far enough axially for this purpose, Figs. 57–62 illustrating an embodiment of my invention wherein each end of each thread projects substantially axially downwardly on each side of said pointed portion of the shank with the ends of said threads thus terminating in spaced incising points on each side of said pointed portion of the shank, in the embodiment of my invention shown in Figs. 59–61 below said tip of the pointed portion of the shank and in the embodiment of my invention shown in Fig. 62 substantially even with the tip of the pointed portion of the shank, and in the embodiment of my invention shown in Fig. 63 with the ends of said threads terminating in spaced incising blades on each side of the tip of said pointed portion of the shank.

Figure 57:
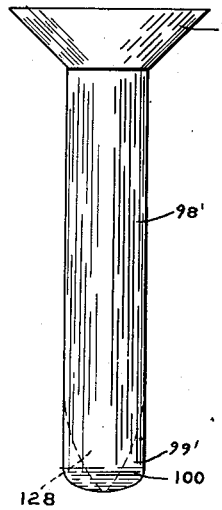
Figure 58:
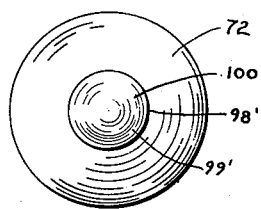

Figs. 57–61 illustrate an embodiment of my invention wherein the ends of the threads terminate in spaced incising points projecting below the tip of the pointed portion of the shank, Fig. 57 being a side elevation and Fig. 58 a reverse plan view of a suitable blank for rolling this species of screw, Fig. 59 being a side elevation, Fig. 60 a reverse plan view and Fig. 61 being a side elevation taken at right angles to the side elevation shown in Fig. 59 of the completed screw with the upper ends of the threads tapering inwardly to the shank.

Fig. 62 is a side elevation of an embodiment of screw similar to that shown in Figs. 59–61, in which the ends of the threads terminating in spaced incising points do not project below the tip of the pointed portion of the shank and in which the double threads are not tapered near the upper ends.

Fig. 63 is a reverse plan view of an embodiment of my invention in which the ends of the threads terminate in spaced incising blades on opposite sides of the tip of the pointed portion of the shank.

In the drawings, wherein like characters of reference generally indicate like parts throughout, 70 generally indicates a screw constructed in accordance with my invention.

As stated hitherto, it has been customary in the prior art to form pointed portions 75 of conical shape on the screw blanks 98 prior to rolling threads thereon. Great difficulty has been experienced in finding enough metal from such a conically pointed portion of the shank to form threads extending to or beyond the tip 76 of said conically pointed portion 75. This is particularly true where it is desired to roll double threads as they require considerable metal.

My invention is adapted for use in rolling double threaded screws. My improved screw has the usual head 72, the shank 74 and the tapered pointed portion 75 of the shank terminating in the tip 76 and the continuous double threads 78 extending spirally downwardly through at least a portion of said shank 74 and said tapered pointed portion 75. Each thread 78 tapers outwardly to a sharp continuous spiral cutting razor-like edge 79 of substantially even height throughout the shank 74 and of progressively decreasing height in said tapered portion of the shank 75. If desired, the threads may taper downwardly at the upper ends thereof to the shank as at 80, thus being of progressively increasing height at the upper ends thereof, it being obvious that with this structure the shank 74 itself is slightly tapered in reverse direction as at 81 at this portion as less metal is extruded therefrom to form said threads. Employing my invention, the lower ends of said double threads form sharp incising means 82 projecting substantially axially downwardly of the pointed portion 75 of said shank in all embodiments of my invention. In the embodiments of my invention shown in Figs. 32–36 and 39–44, the ends of said threads 82 are merged to form a sharp incising point 84. In the embodiment of my invention shown in Figs. 32-35, the sharp incising point 84 is substantially aligned axially with the tip 76 of the pointed portion 75 of the shank. In the embodiment of my invention shown in Figs. 37 and 38, the threads 78 do not merge in the sharp incising point 84 but terminate above the tip 76 of the pointed portion 75 of the shank. In the embodiment of my invention shown in Figs. 37 and 38, as well as in the other embodiments just referred to, the ends 82 of the threads form oppositely positioned cutting edges 86 extending obliquely upwardly from the tip 76 of said pointed portion 75 and project axially downwardly on each side of said pointed portion 75 as at 82, in the embodiment of my invention shown in Figs. 37 and 38, however, not far enough downwardly to form the sharp incising point 84.

In the embodiments of my invention shown in Figs. 45-56, the ends 82 of said threads form oppositely positioned aligned cutting edges 88 extending radially outwardly from the tip 76 of the pointed portion 75 of the shank and project axially downwardly on each side of said pointed portion 75 to form the sharp cutting blade 90. In the embodiment of my invention shown in Figs. 45-50, the end of said blade 90 is substantially in alignment with the tip 76 of the pointed portion 75 of said shank. In the embodiment of my invention shown in Figs. 51-56, the blade 90 projects axially downwardly below the tip 76 of said pointed portion 75.

In the embodiments of my invention shown in Figs. 57-63, the ends 82 of the threads 78 project substantially axially downwardly and terminate in spaced incising means 82 on each side of the pointed portion 75 of said shank, in the embodiment of my invention shown in Figs. 57-60 terminating in spaced incising points 84 projecting axially downwardly below the tip 76 of the pointed portion 75 of said shank, in the embodiment shown in Fig. 62 terminating substantially evenly with the tip 76 of the pointed portion 75 of said shank and in the embodiment shown in Fig. 63 said ends comprising spaced blades 90.

In the embodiments of my invention shown in the first five figures in each group, the threads 78 are of progressively increasing height, as shown at 80, at the upper end thereof, with such portion of the shanks correspondingly inwardly tapered as at 81, of substantially even height, as at 78, throughout the remainder of the shank, and of progressively decreasing height, as at 94, on the tapered portion 75 of said shank. The outer edges 79 of said threads comprise sharp razor-like edges due to the fact that my improved screws are rolled, a feature impossible to provide in any type of a cut screw.

A comparison of Figs. 36 and 37 in view of Fig. 17, will illustrate what the applicant means by the clause "the threads 78 are progressively increased in height, as shown at 80, at the upper end thereof, with such portions of the shanks correspondingly inwardly tapered as at 81." This distinction is clearly shown by the screw shown in Fig. 36 where these effects are produced which effects are not produced in the screw shown in Fig. 37. The clause "tapered inwardly to the shank" means that the crests of the threads taper radially inwardly to the shank from the upper end thereof, which is identical in meaning to the clause just referred to, namely, that "the threads 78 are progressively increased in height, as shown at 80, at the upper end thereof.

My invention also includes a novel method of rolling double threaded screws, which comprises pressure shaping or otherwise forming a length of stock 97 into a blank 98 having a head 72 on one end thereof and an irregular shaped pointed portion 99 having an excess of metal 100 thereon greater than required for a conically pointed portion 128, as shown in dotted lines in Figs. 4, 6, 8 and 10, on the opposite end thereof, and rolling continuous double threads 78 on the other end of the shank 74 adjacent to and on said pointed portion 99 and displacing said excess metal 100 on said pointed portion 99 to form it into the pointed portion 75 of the finished screw and to form continued threads 94 on said pointed portion 75, each terminating in sharp incising means 82 projecting substantially axially downwardly of said pointed portion 75. The irregularly shaped pointed portion 99 having an excess of metal 100 thereon greater than required for a conical pointed portion 128 may be formed in any suitable manner, if desired in a separate pointing step, as shown in my application Ser. No. 290,621, aforesaid. I have found, however, that while the formation of a true conically pointed portion 128 has been difficult in the header, my improved pointed portion 99 is of such irregular shape that it may be readily formed in the header, preferably in the initial blow for roughening the head, or the irregular shaped pointed portion 99 may be made in any suitable fashion.

The threads 78 may be rolled on the screw blanks 98 in any suitable manner, such as in the manner shown in application Ser. No. 290,621, aforesaid, by true radial extrusion. Commercial results, however, may be obtained by rolling them in a standard type of dies for rolling machine screw threads, such as shown in the accompanying drawings, modified to roll double threads by providing groove means 104 in said dies having an included angle of substantially 45° and a pitch angle of 8°-15°, preferably of substantially 10°. With this type of rolling dies the excess metal 100 is forced axially downwardly as well as radially outwardly over the sides of the pointed portion 99 of the shank and even beyond the tip 76 of said simultaneously formed pointed portion 75, if desired to form the threads 94 of decreasing height terminating in the sharp incising means 82, whether merged to form the single point 84 or the single blade 90, or left spaced to provide the spaced means 82 comprising the spaced points 84 or the spaced blades 90. It is thus obvious that the amount of excess metal 100 provided may be varied, as well as the method and amount of rolling varied to produce these different results. Thus, where a quantity of metal is required, as in a blade 90, more excess metal may be provided in the pointed portion 99 of the blank 98, as in the embodiment shown in Figs. 6 and 7, having a dome shaped pointed portion 99' of large radius. When the desired type of screw has been decided upon, the amount of excess metal 100 provided at the pointed portion 99 of the blank 98 and the nature and the amount of rolling may be predetermined so as to continuously reproduce the same type of screw, the amount of excess metal 100 depending, therefore, upon the desired shape of the incising means 82 desired in the finished screw, the incising means 82 of the desired predetermined shape being produced by variations in the amount of excess metal 100 and the type of and the amount of rolling employed. As stated, if desired, the ends 82 of the threads may terminate slightly above the tip 76 of the pointed portion 75 of the screw shank, as shown in Figs. 37 and 38. While I preferably roll said threads 94 down to an incising point 84 or blade 90, a novel desirable type of screw may be produced if the threads are not rolled down to a single point or a single blade, but left terminating in spaced incising means 82 or 90, on each side of the pointed portion 75 of the screw shown in Figs. 57–63, in which the screw may initially bite into the wood or other material at two points or portions, tending initially to more evenly align it and provide a self-centering screw.

Figure 1:
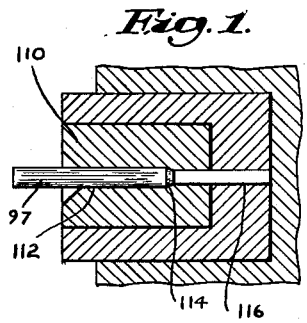
Figure 2:
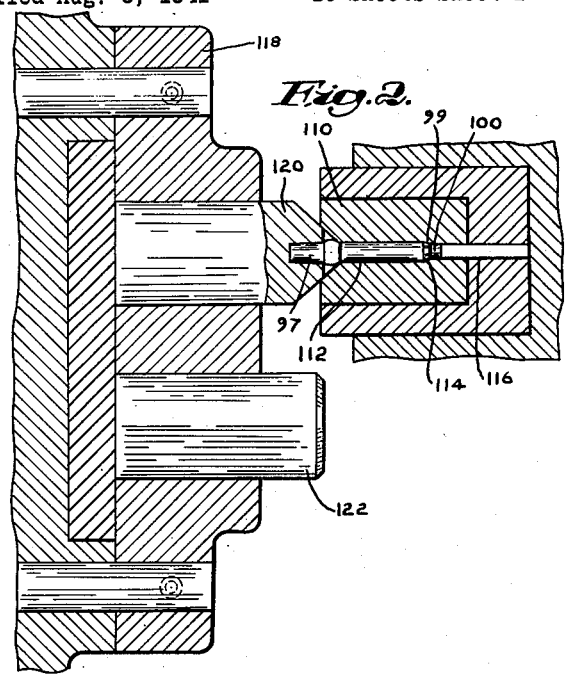
Figure 3:
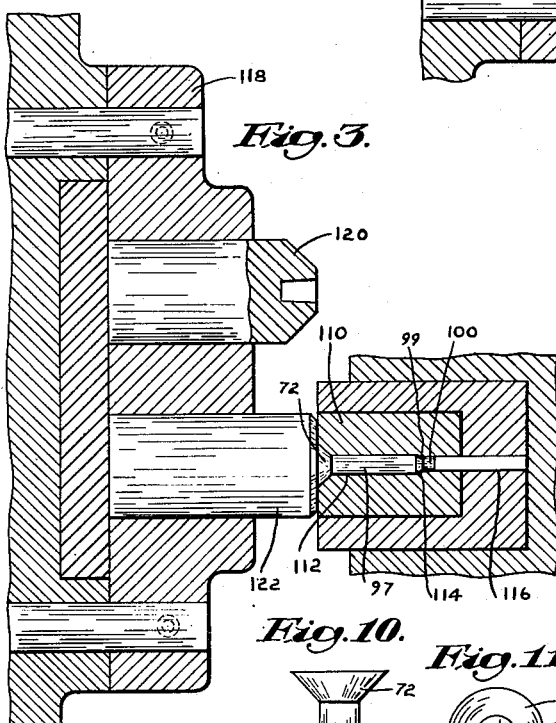
Fig. 3 is a sectional view identical with Fig. 2, showing the finishing punch stroke in the act of completing the formation of the head on the screw blank shank.
Figures 4, 6, 8:
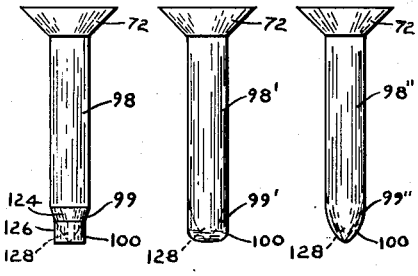
Fig. 4 is a side elevation and Fig. 5 is a reverse plan view of one embodiment of screw blank after it has been formed in the header with an excess of metal on the pointed portion of the shank greater than is required for a conically pointed portion.
Fig. 6 is a side elevation and Fig. 7 is a reverse plan view of another embodiment of screw blank constructed in accordance with my invention having a domed tip of relatively large radius and being particularly suited to roll a cutting blade.
Fig. 8 is a side elevation and Fig. 9 is a reverse plan view of a still further embodiment of screw blank constructed in accordance with my invention, employing a conically pointed portion with slightly domed walls to provide the excess metal for the threads.
Figures 5, 7, 9:
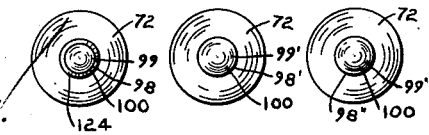
Figures 10, 11:
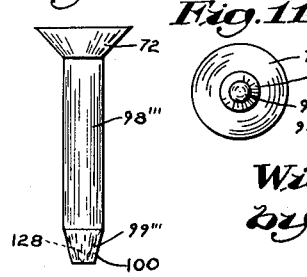
Fig. 10 is a side elevation and Fig. 11 is a reverse plan view of a still further embodiment of screw blank constructed in accordance with my invention, having a frustoconical pointed portion.

I have shown in the drawings suitable apparatus for carrying out my improved method. I have shown in Figs. 1–3 diagrammatic portions of a heading machine. For this purpose the female heading die 110 may be provided with the usual bore 112 for receiving the stock 97. Said bore 112 is provided with the inwardly tapering portion 114 near the inner end thereof and a portion 116 of smaller bore or diameter beyond said tapered portion 114. The header may be provided with the usual multiple punch holder 118 having the usual coning punch 120 for initiating the shape of the head 72 and the finishing punch 122. I have shown in Fig. 2 the stock 97 being formed with the excess of metal 100 on the pointed portion 99 greater than required for a conically pointed portion 75 of the screw shank made by jamming the piece of stock 97 inwardly within said bore 112 through said tapered portion 114 so that the end 99 thereof terminates within the portion 116 of smaller diameter to provide the screw blank 98 shown in Figs. 4 and 5 having a pointed portion 99 comprising a tapered portion 124 and a portion of smaller diameter 126 below said tapered portion, said tapered portion 124 and portion 126 of smaller diameter forming the pointed end portion 99 of the screw blank 98, providing the excess of metal 100 greater than required for a conically pointed portion 128. Thus the screw blanks 98 are shaped for rolling with the desired excess metal 100 thereon in the roughening or coning stroke of the header, it being obvious that the completion of the head into the desired shape 72 is accomplished by the second finishing punch stroke of the finishing punch 122, as shown in Fig. 3. I have shown in Figs. 4–11 various species of screw blanks having the pointed ends 99 having the excess of metal 100 thereon, the embodiment 99 shown in Figs. 4 and 5 having the tapered portion 124 and the cylindrical portion 126 of smaller diameter as hitherto described in excess of the conically pointed portion 128. I have shown in Fig. 6 a screw blank 98' having the excess metal 100 thereon and having a dome shaped end 99' with a dome of relatively large radius to provide considerable excess metal 100 for rolling a screw having one or more blades 90 or points 82 in the manner to be described. I have shown in Figs. 8 and 9 a screw blank 98'' having a conical point 99'' with the excess metal 100 being provided by doming the side walls of the conical point 128. I have shown in Figs. 10 and 11 a suitable blank 98''' formed with a frusto conical point 99''' to provide another manner of providing the excess metal 100 in excess of a conical point 128. As stated, however, any desired pointed portion 99 may be formed on the screw blank 98 by a separate pointing process if desired. For cheapness and economy of manufacture, however, due to the peculiar rough shaping required in the pointed portion of the screw blanks, these may be readily roughed out simultaneously with the initial heading step by the application of the same force, the initial punching blow of a standard heading machine.

I have shown in Figs. 12–20 suitable types of dies generally similar to the standard dies for rolling single threads on machine or other screws, modified to roll the double threads 78 extending at least to the extreme tip 76 of the pointed portion 75 of the shank 74 in accordance with my invention. These dies comprise the usual stationary die 130 and the die 132 movable relatively thereto in a standard type of screw rolling machine, a suitable type being shown in Arenz Patent No. 1,651,796. Each die 130 and 132 has a face 134 comprising a continuous cavity 136 having a cooperating inwardly tapered portion 138 adjacent the upper end thereof and a pointed portion forming portion 140 tapering arcuately outwardly to the surface of said die beyond said cavity 136. Each face 134 is provided with continuous thread forming groove means 104, each terminating in a sharp intaglio ridge 106, extending obliquely inwardly thereof at spaced distances throughout the height of said face throughout said tapered portion 138, the shank forming portion 146 and said pointed portion forming portion 140. Each groove means 104 is of progressively increasing depth in said tapered portion 138, of substantially even depth in said shank forming portion 146 and of progressively decreasing depth in said pointed portion forming portion 140.

In order to provide the double threads 78, the groove means 104 has an included angle of substantially 45° and a pitch angle of substantially 8°–15°, preferably substantially 10°. The tapered portion 138 in each respective die may be provided in the manner shown and described in my application Ser. No. 290,621, aforesaid, the tapered portion 138 in this instance, however, being for a different purpose than shown in said application and of a much less degree. As stated in said application, a portion of each die is obliquely removed adjacent one edge thereof, in this instance the upper edge thereof being cut, ground, or otherwise to form the tapered portion 138. I then concave the face 134 of each die with a screw blank cavity and suitably form the thread forming grooves 104 in said cavity, preferably by a suitable hob whereby the thread forming grooves 104 are of progressively less respective depth in the pointed portion forming portion thereof and terminate in the sharp razor-like edges 106. It will be noted that as in a standard type of dies, the lands 148 between the grooves progressively widen and the grooves 104 themselves progressively narrow lengthwise of the dies. If desired, the lands 148 near the front end of the die may be suitably roughened as is customary in dies, as at 150. The various positions a, b, c, d and e that a screw blank assumes in being rolled are shown in Fig. 12 to illustrate different stages in the act of rolling the threads, the threads being initially roughened at b, the threads 78 themselves progressively narrowed from b to e and the lanes 152 between the threads 78 progressively widened from b to e.

To more accurately show how the excess metal 100 is displaced axially and formed into the threads 94 at the pointed portion 75 of the shank and into the tip 84 or blade 90, I have shown in Figs. 22–31 enlarged side elevations and reverse plan views of the screw blanks in the various positions a to e. A close inspection of these figures and of Fig. 12 reveals how the excess metal 100 is displaced axially to form the threads 94 from the pointed portion 99 merging into the incising point 84 and to shave down the pointed portion 99 of the screw blank 98 into the pointed portion 75 of the screw. It will be observed that the embodiment of my invention shown in Figs. 57–61 appears somewhat like the screw produced at stage d in my improved method, in which the ends 82 of the threads are not positively rolled together or merged to form the point 84. Each respective die may be provided with the guide blades 154 adapted to abut each side of the shank 74 above the threads 78. A close inspection of Figs. 22–31 illustrates how the length of the screw increases at the different stages as the threads are formed thereon. It is obvious, however, that any method of rolling screws may be employed, such as the specific method of radial extrusion described in my application Ser. No. 290,621, aforesaid.

In the embodiment of my invention shown in Figs. 32–37, the lower ends 82 of the threads merge to form the sharp incising point 84 forming the oppositely positioned cutting edges 86 extending obliquely downwardly to said point 84 and projecting axially downwardly on each side of the pointed portion 75 of said shank.

As stated, the embodiment of my invention shown in Figs. 37 and 38 differs from that shown in Figs. 32–36 in that the ends 82 of the threads terminate above the tip 76 of the pointed portion 75 of the shank and the upper ends 80 of the threads do not taper inwardly.

In the embodiment of my invention shown in Figs. 39–44, the ends 82 of said threads are merged to form the sharp incising point 84 projecting axially below said tip 76 of the pointed portion 75 of the shank and form similarly oppositely positioned cutting edges 86 extending obliquely upwardly from said point 84 and projecting substantially axially downwardly on each side of the pointed portion 75 of said shank. It is impossible to make this type of screw by cutting.

In the embodiment shown in Fig. 44 the upper ends 80 of the threads do not taper inwardly as in the embodiment shown in Figs. 39–43.

I have shown in Figs. 45–56 embodiments of my invention wherein the ends 82 of said threads form oppositely positioned aligned cutting edges 88 extending radially outwardly from the tip 76 of the pointed portion 75 of said shank, and projecting axially downwardly on each side of said pointed portion 75 to form the sharp cutting blade 90. In the embodiments of my invention shown in Figs. 45–50, the lower edge of said blade 90 contains the tip 76 of said pointed shank portion 75. In the embodiments of my invention shown in Figs. 51–56, said blades 90 projects axially downwardly from the pointed portion 75 of the shank and terminates a substantial distance below the tip 76 of the pointed portion 75 of said shank. It is also obvious that it is absolutely impossible to cut any type of a screw having a cutting blade 90 at the lower end thereof, and it is the applicant's contention that the type of screws shown in any of the drawings and specifically claimed herein can only be made by the applicant's improved rolling method.

In the embodiment of my invention shown in Fig. 56, the upper ends 80 of the threads do not taper inwardly as in the embodiment shown in Figs. 51–54.

In the embodiments of my invention shown in Figs. 57–63, the ends 82 of said threads project axially downwardly on each side of said pointed portion 75 and terminate in spaced incising means 82 on each side of the tip 76 of said pointed portion 75. In the embodiment of my invention shown in Figs. 57–61, said spaced incising means 82 terminate below the tip 76, and in the embodiment of my invention shown in Fig. 62 they terminate substantially evenly with said shank tip 76. Said means 82 may comprise the points 84 shown in Figs. 59–62 or the blades 90 shown in Fig. 63. As stated, it is apparent that such a screw having spaced incising means 82 may initially bite into the wood or other material at two places or portions, tending to more accurately initially align the screw and to provide a self-centering screw. It is also believed impossible to cut such a type of screw.

It is obvious that any of these novel types of screws may be made by my improved method, the shape and nature of the incising means projecting axially from the lower end of the pointed portion 75 of the screw depending on the amount of excess metal 100 provided in the pointed portion 99 of the screw blank 98 and the method of and amount of rolling, it being obvious that once these factors have been determined, identical screws may be continuously produced by my method having identical predetermined incising means.

It is apparent that I have not only provided a novel method of manufacturing rolled screws, but also novel types of screws inherently new in themselves, which so far as I am aware can only be produced by my improved method, and which of themselves have distinct specific commercial advantages.

It is understood that my invention is not limited to the specific embodiment shown or methods described and that various deviations may be made therefrom without departing from the spirit and scope of the appended claims.

What I claim is:

1. A screw having a head, a shank and a tapered point forming portion and having continuous double threads surface hardened by cold rolling extending spirally downwardly through at least a portion of said shank and said tapered point forming portion, each thread tapering radially outwardly to a sharp continuous spiral cutting edge of progressively increasing height at the upper end thereof, substantially even height throughout the remainder of the shank providing a thread diameter greater than the shank diameter and of progressively decreasing height in said tapered point forming portion, the lower ends of said threads forming sharp incising means projecting substantially axially downwardly of the point forming portion of said shank, said threads in said point forming portion being formed from a greater excess of metal than required for a conically pointed blank.

2. A screw having a head, a shank and a tapered point forming portion and having continuous double threads surface hardened by cold rolling extending spirally downwardly through at least a portion of said shank and said tapered point forming portion, each thread tapering radially outwardly to a sharp continuous spiral cutting edge of substantially even height throughout the shank and of progressively decreasing height in said tapered point forming portion, the lower ends of said threads forming sharp incising means projecting substantially axially downwardly of the point forming portion of said shank, said threads in said point forming portion being formed from a greater excess of metal than required for a conically pointed blank.

3. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads being merged to form a sharp incising point projecting axially downwardly below the tip of said tapered point forming portion, and forming oppositely positioned cutting edges extending obliquely upwardly from said point projecting substantially axially downwardly on each side of the point forming portion of said shank, said threads in said point forming portion being formed from a greater excess or metal than required for a conically pointed blank.

4. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads being merged to form a sharp incising point and forming oppositely positioned cutting edges extending obliquely upwardly from said point and projecting substantially axially downwardly on each side of the point forming portion of said shank, said threads in said point forming portion being formed from a greater excess of metal than required for a conically pointed blank.

5. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads forming oppositely positioned aligned cutting edges extending radially outwardly from the axis of said shank and projecting substantially axially downwardly on each side of and terminating below the tip of the point forming portion of said shank to form a sharp cutting blade, said threads in said point forming portion being formed from a greater excess of metal than required for a conically pointed blank.

6. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads forming oppositely positioned aligned cutting edges extending radially outwardly from the tip of the point forming portion of said shank and projecting substantially axially downwardly on each side of said point forming portion to form a sharp cutting blade, said threads in said point forming portion being formed from a greater excess of metal than required for a conically pointed blank.

7. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads projecting substantially axially downwardly below the tip of the pointed portion of said shank on each side of said pointed portion of said shank and terminating in spaced incising points below said tip and on each side of the pointed portion of said shank, said threads in said point forming portion being formed from a greater excess of metal than required for a conically pointed blank.

8. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads projecting substantially axially downwardly on each side of the pointed portion of said shank and terminating in spaced incising points on each side of the pointed portion of said shank, said threads in said point forming portion being formed from a greater excess of metal than required for a conically pointed blank.

9. A screw having a head, a shank and a tapered point forming portion and having continuous double threads surface hardened by cold rolling extending spirally downwardly through at least a portion of said shank and said tapered point forming portion, each thread tapering outwardly to a sharp continuous spiral cutting edge of substantially even height throughout the shank and of progressively decreasing height in said tapered point forming portion, the ends of said threads projecting substantially axially downwardly on each side of the pointed portion of said shank and terminating in spaced incising means on each side of the pointed portion of said shank, said threads in said point forming portion being formed from a greater excess of metal than required for a conically pointed blank.

10. The method of manufacturing a rolled double threaded screw which comprises shaping a length of stock to form a shank and a pointed portion having an excess of metal thereon greater than required for a conical pointed portion and rolling continuous double threads on said shank adjacent said pointed portion and displacing said excess metal on said pointed portion to form continued threads on said pointed portion, each terminating in sharp incising means projecting substantially axially downwardly of said pointed portion.

11. The method of manufacturing a rolled double threaded screw which comprises shaping a length of stock to form a shank and a pointed portion having an excess of metal thereon greater than required for a conical pointed portion and rolling continuous double threads on said shank adjacent said pointed portion and displacing said excess metal on said pointed portion to form continued threads on said pointed portion extending to the tip of the pointed portion.

12. The method of manufacturing a rolled double threaded screw which comprises shaping a length of stock to form a shank and a pointed portion having an excess of metal thereon greater than required for a conical pointed portion and rolling continuous double threads on said shank adjacent said pointed portion and displacing said excess metal on said pointed portion to form continued threads on said pointed portion, extending below the tip of the pointed portion.

13. The method of manufacturing a rolled double threaded screw which comprises shaping a length of stock to form a shank and a dome shaped pointed portion and rolling continuous double threads on said shank adjacent said dome shaped portion and displacing the excess metal on said dome shaped portion to form continued double threads on said portion, each terminating in sharp incising means projecting substantially axially downwardly of said pointed portion.

14. The method of manufacturing a rolled double threaded screw which comprises shaping a length of stock to form a shank and a substantially frusto conical pointed portion and rolling continuous double threads on said shank adjacent the pointed portion and displacing the excess metal on said pointed portion to form continued threads on said pointed portion, each terminating in sharp incising means projecting substantially axially downwardly of said point of said shank.

15. The method of manufacturing a rolled double threaded screw which comprises shaping a length of stock to form a shank and a pointed portion having an excess of metal thereon greater than required for a conically pointed portion and rolling continuous double threads on said shank adjacent said pointed portion and displacing said excess metal on said pointed portion to form continued double threads on said pointed portion, merging in a sharp incising point in the axis of said screw with the lower portions of said threads extending obliquely upwardly from said point and projecting substantially axially downwardly on each side of the pointed portion.

16. The method of manufacturing a rolled double threaded screw which comprises shaping a length of stock to form a shank and a pointed portion having an excess of metal thereon greater than required for a conically pointed portion and rolling continuous double threads on said shank adjacent said pointed portion and displacing said excess metal on said pointed portion to form continued double threads on said pointed portion, merging in a sharp incising point in the axis of said screw below the tip of the pointed portion of the shank with the lower portions of said threads extending obliquely upwardly from said point and projecting substantially axially downwardly on each side of the pointed portion.

17. The method of manufacturing a rolled double threaded screw which comprises shaping a length of stock to form a shank and a dome shaped pointed portion on the end thereof and rolling continuous double threads on said shank adjacent said dome shaped portion and displacing the excess metal on said dome shaped portion to form continued double threads on said portion, merging in a sharp incising point in the axis of said screw with the lower portions of said threads extending obliquely upwardly from said point and projecting substantially axially downwardly on each side of said pointed portion.

18. The method of manufacturing a rolled double threaded screw which comprises shaping a length of stock to form a shank and a substantially frusto conical pointed portion on the end thereof and rolling continuous double threads on said shank adjacent said pointed portion and displacing the excess metal on said pointed portion to form continued threads on said pointed portion, merging in a sharp incising point in the axis of said screw with the lower portions of said threads extending obliquely upwardly from said point and projecting substantially axially downwardly on each side of said pointed portion.

19. The method of manufacturing a rolled double threaded screw which comprises shaping a length of stock to form a shank and a blunt dome shaped pointed portion on the end thereof and rolling continuous double threads on the shank adjacent said dome shaped portion and displacing the excess metal on said dome shaped portion to form continued double threads on said portion terminating in a sharp cutting blade having oppositely positioned aligned cutting edges extending radially outwardly from the axis of said shank.

20. The method of manufacturing a rolled double threaded screw which comprises shaping a length of stock to form a shank and a blunt dome shaped pointed portion on the end thereof and rolling continuous double threads on the shank adjacent said dome shaped portion and displacing the excess metal on said dome shaped portion to form continued double threads on said portion terminating in a sharp cutting blade extending below the tip of the pointed portion having oppositely positioned aligned cutting edges extending radially outwardly from the axis of said shank.

21. The method of manufacturing a rolled double threaded screw which comprises shaping a length of stock to form a shank and a pointed portion having an excess of metal thereon greater than required for a conical pointed portion on the end thereof, the amount of excess of metal depending on the desired shape of the incising means on the rolled screw, and rolling continuous double threads on said shank adjacent said pointed portion and axially displacing and molding said excess metal on said pointed portion to form continued threads on said pointed portion, each terminating in sharp incising means of the desired predetermined shape projecting substantially axially downwardly of said pointed portion.

22. The method of manufacturing a rolled double threaded screw which comprises shaping a length of stock to form a shank and a dome shaped pointed portion on the end thereof, the amount of excess of metal in the dome depending on the desired shape of the incising means on the rolled screw, and rolling continuous double threads on said shank adjacent said dome shaped portion and axially displacing and molding the excess metal on said dome shaped portion to form continued double threads on said portion, each terminating in sharp incising means of the desired predetermined shape projecting substantially axially downwardly of said pointed portion.

23. The method of manufacturing a rolled double threaded screw which comprises shaping a length of stock to form a head, a shank and a point having an excess of metal thereon greater than required for a conical point on one end thereof and rolling continuous double threads on said shank adjacent said point and displacing said excess metal on said point to form continuing double threads on said point terminating in a diametric cutting edge at the tip thereof.

24. The method of manufacturing a rolled double threaded screw which comprises shaping a length of stock to form a shank and a point having an excess of metal thereon greater than required for a conical point and rolling continuous double threads on said shank adjacent said point and displacing said excess metal on said point to form continuing double threads on said point terminating in a diametric cutting edge at the tip thereof.

25. The method of manufacturing a rolled double threaded screw which comprises shaping a length of stock to form a head on one end thereof, a shank and a point having an excess of metal thereon greater than required for a conical point and rolling continuous double threads on said shank adjacent said point and displacing said excess metal on said point to form continuing double threads on said point terminating in a diametric cutting edge adjacent the tip thereof.

26. The method of manufacturing a rolled double threaded screw which comprises shaping a length of stock to form a shank and a point having an excess of metal thereon greater than required for a conical point and rolling continuous double threads on said shank adjacent said point and displacing said excess metal on said point to form continuing double threads on said point terminating in a diametric cutting edge adjacent the tip thereof.

WILLIAM A. DE VELLIER.